United States Patent [19]
Maruyama et al.

[11] Patent Number: 5,597,153
[45] Date of Patent: Jan. 28, 1997

[54] AUTOMATIC ORIGINAL FEED APPARATUS

[75] Inventors: Hiroyoshi Maruyama, Yokohama; Yuji Takahashi, Tokyo; Yoshikuni Toyama, Yokohama; Shinichi Tanada, Isehara; Toshihiko Kusumoto; Masahiko Yashiro, both of Yokohama, all of Japan

[73] Assignee: Canon Kabushiki Kaisha, Tokyo, Japan

[21] Appl. No.: 531,887

[22] Filed: Sep. 22, 1995

Related U.S. Application Data

[63] Continuation of Ser. No. 199,654, Feb. 22, 1994, abandoned.

[30] Foreign Application Priority Data

Feb. 22, 1993 [JP] Japan .................................. 5-056527

[51] Int. Cl.⁶ .................................................. B65H 5/22
[52] U.S. Cl. .......................... 271/4.1; 271/3.2; 271/9.09; 271/301; 271/186; 399/374
[58] Field of Search .................................. 355/318, 317, 355/320; 271/186, 301, 3.14, 3.18, 3.2, 4.1, 9.09, 186, 301

[56] References Cited

U.S. PATENT DOCUMENTS

| | | | |
|---|---|---|---|
| 4,140,387 | 2/1979 | Gustafson | 355/14 |
| 4,158,500 | 6/1979 | DeFrancesco et al. | 355/14 |
| 4,176,945 | 12/1979 | Holzhauser | 355/23 |
| 4,544,148 | 10/1985 | Kitajima et al. | 271/3.1 |
| 4,812,874 | 3/1989 | Kubota et al. | 355/7 |
| 4,819,025 | 4/1989 | Takahashi et al. | 355/14 |
| 4,829,341 | 5/1989 | Sasaki et al. | 355/75 |
| 4,844,434 | 7/1989 | Acquaviva et al. | 271/3 |
| 4,908,662 | 3/1990 | Yamamoto et al. | 355/218 |
| 4,941,023 | 7/1990 | Holmes et al. | 271/3 |
| 5,438,435 | 8/1995 | Lawniczak | 355/320 |

FOREIGN PATENT DOCUMENTS

| | | | |
|---|---|---|---|
| 0166361 | 10/1983 | Japan | 355/320 |
| 0113770 | 5/1989 | Japan | 355/319 |

*Primary Examiner*—H. Grant Skaggs
*Attorney, Agent, or Firm*—Fitzpatrick, Cella, Harper & Scinto

[57] ABSTRACT

The present invention provides an automatic original feed apparatus comprising an original stacking portion on which a plurality of originals can be rested, an introduction path for directing the original supplied from the original stacking portion to a reading portion, an annular reverse rotation path for reversely rotating the original discharged from the reading position and for directing the original to the reading position again, a discharge path for discharging the original discharged from the reading position onto a discharge portion, and original feed rotary members arranged in the introduction path, reverse rotation path and discharge path, respectively, and rotated in one direction.

16 Claims, 6 Drawing Sheets

AUTOMATIC ORIGINAL FEED APPARATUS

This application is a continuation, of application Ser. No. 8/199,654 filed Feb. 22, 1994, now abandoned.

BACKGROUND OF THE INVENTION

1. Field of the Invention

The present invention relates to an automatic original feed apparatus, and more particularly, it relates to an automatic original feed apparatus having a reverse rotation path and a being capable of reading both surfaces of an original.

2. Related Background Art

Conventionally, automatic original feed apparatuses in which an original is fed to a predetermined reading position in order to read image information on the original are already known. In such apparatuses, switch means for switching back the original and a reversible motor therefor are provided for reversing or inverting the original. For example, refer to U.S. Pat. Nos. 4,140,387; 4,158,500; 4,176,945; and 4,544,148.

However, in the above-mentioned conventional automatic original feed apparatuses, the arrangement for reading both surfaces of the original is very complicated and the control therefor is also complicated.

SUMMARY OF THE INVENTION

The present invention intends to eliminate the above-mentioned conventional drawbacks and has an object to provide an automatic original feed apparatus having simple construction and control.

To achieve the above object, according to the present invention, an automatic original feed apparatus comprises an original stacking portion on which a plurality of originals can be rested, an introduction path for directing the original supplied from the original stacking portion to a reading portion, an annular reverse rotation path for reversely rotating or inverting the original discharged from the reading position and for directing the original to the reading position again, a discharge path for discharging the original discharged from the reading position onto a discharge portion, and original feed rotary members arranged in the introduction path, reverse rotation path and the discharge path, respectively, and rotated in one direction.

Further, the reading of the original is effected by fixing the optical system and by reading the original while moving the original (reading-through). In addition, a second discharge path is provided for discharging the original discharged from the reading position onto the discharge portion in one-face reading of the original. Further, other than the introduction path, there is also provided a manual insertion introduction path for directing an original to the reading position.

The original supplied from the original stacking portion is directed to the introduction path and then is conveyed to the reading position, where the image information on the front surface of the original is read by the optical system. In a both-face reading mode, the original is then inverted in the reverse rotation path and is directed to the reading position again, where the image information on the back surface of the original is read. Then, the original discharged from the reading position is discharged onto the discharge portion through the discharge path.

Both in the both-face reading mode and in a one-face reading mode, when the image information on the original is read, since the original feed rotary members are rotated only in one direction (without rotated reversely), the construction and control of the apparatus can be highly simplified.

DETAILED DESCRIPTION OF THE PREFERRED EMBODIMENTS

The present invention will now be explained in connection with embodiments thereof with reference to the accompanying drawings.

Figure 1:
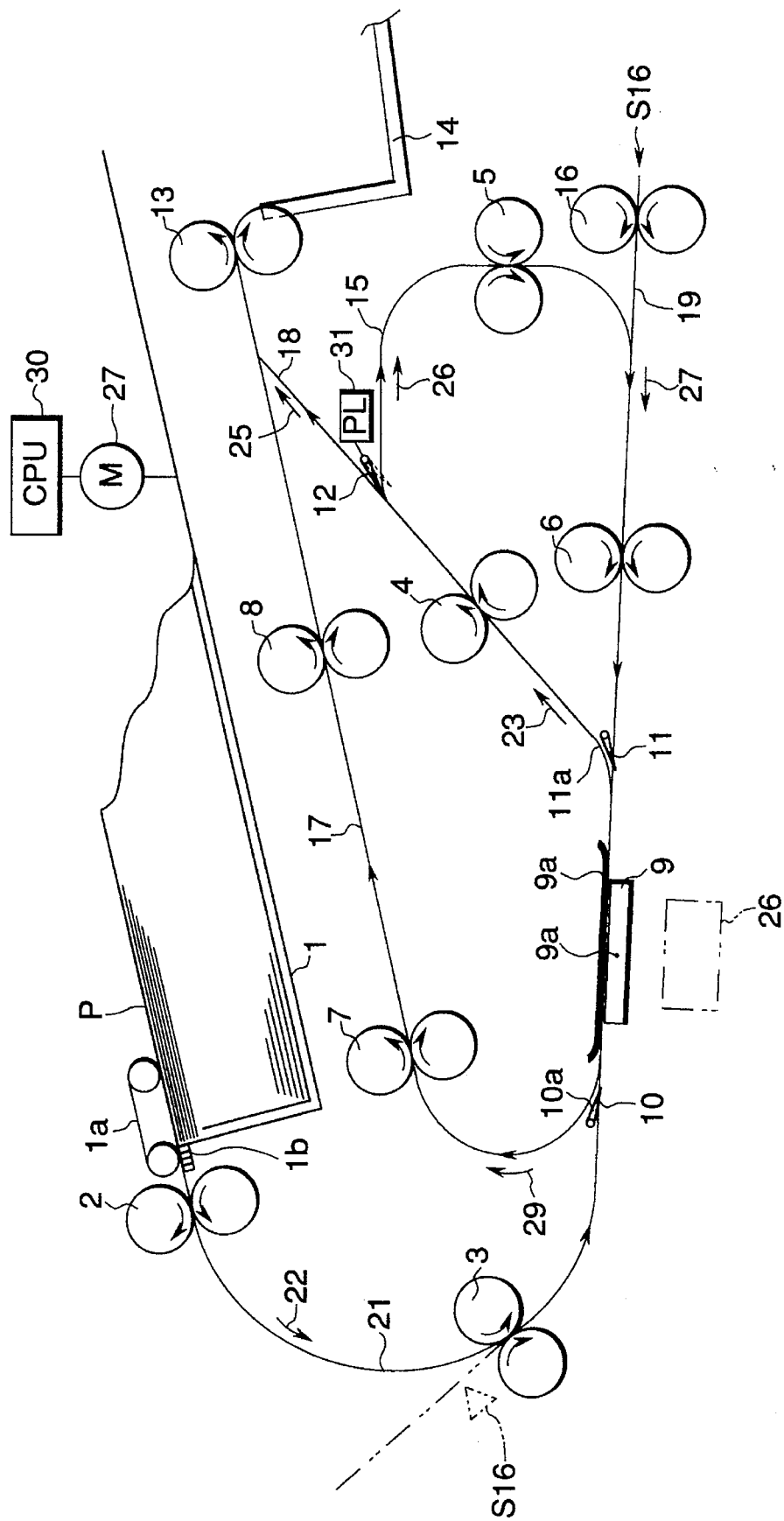
FIG. 1 is a schematic sectional front view of an automatic original feed apparatus according to an embodiment of the present invention.

FIG. 1 shows a main part of an automatic original feed apparatus according to an embodiment of the present invention. In FIG. 1, a plurality of originals P with front surfaces facing upwardly are stacked on an original stacking plate 1. An original separation means 1b serves to separate the originals P one by one and to feed out the separated original. The original P is then directed to an introduction path 21 by sheet supply rollers 2.

The original P in the introduction path 21 is directed to a reading position (platen glass) 9 by a pair of sheet convey rollers 3 each rotated in one direction shown by the arrow. Above and in the proximity of the reading position 9, there is arranged a guide plate 9a cooperating with the platen glass 9 to form a sheet guide. Further, below the platen glass 9, there is arranged a reading device (optical system) 26 for reading image information on the original, which reading device is normally fixed. In the illustrated embodiment, the reading of the original is effected by fixing the reading device 26 and by shifting the original (reading-through mode). The reading device 26 includes a light source, mirrors, a light receiving element (photoelectric conversion element) and an image treatment portion, and serves to send an electric image signal to a laser modulation means (laser scanner) of an image forming apparatus which will be described later. An automatic original reading apparatus is constituted by the automatic original feed apparatus and the reading device 26.

A path disposed at a downstream side of the reading position 9 is branched into an annular reverse rotation path 15 and a manual insertion introduction path 19 connected to the reverse rotation path. The reverse rotation path 15 includes sheet convey rollers 4 acting as receiver rollers, and sheet convey rollers 5 acting as intermediate rollers, and sheet convey rollers 6 acting as feed rollers, and each of these rollers is rotated in one direction shown by the arrow.

A flapper valve 11 comprising a flexible member made of Mylar or the like is arranged at a junction between the reverse rotation path 15 and the manual insertion path 19 at a downstream side of the reading position 9, which flapper valve is normally positioned as shown in FIG. 1 to direct the original discharged from the reading position 9 toward the sheet convey rollers 4. Further, a path disposed at an upstream side of the reading position 9 is branched into the introduction path 21 and a discharge path 17, and, at the junction thereof, there is arranged a flexible flapper valve 10 similar to the flapper valve 11. The flapper valve 10 is normally positioned as shown in FIG. 1 to direct the original P to the discharge path as shown by the arrow 29 when the original P is moved in a direction shown by the arrow 29, which will be described later.

The discharge path 17 includes sheet convey rollers 7 acting as receiver rollers, sheet convey rollers 8 acting as intermediate rollers, and sheet discharge rollers 13. The original discharged by the discharge rollers 13 is rested on a discharge tray 14. Further, at a downstream side of the sheet convey rollers 4, there is arranged a by-pass (second discharge path) 18 branched from the reverse rotation path 15. The other end (downstream end) of the by-pass is joined to the discharge path 17. A flapper valve 12 for deflecting the original P is arranged at a junction between the reverse rotation path 15 and the by-pass 18. The flapper valve 12 can be rocked by a rotary plunger 31 between a position shown by the solid line and a position shown by the broken line.

A convey distance between the convey rollers 3 and the convey rollers 4 and a reverse convey distance between the feed rollers 6 and the receiver rollers 7 are both selected to be smaller than a length of an available minimum original. Further, a convey length (9a- 4 - 5 - 6 - 9a) of the reverse rotation path 15 starting from a center 9a of the reading position 9 is selected to be greater than a length of an available maximum original. Further, the automatic original feed apparatus includes manual insertion supply rollers 16 by which the manually inserted original P is directed to the reading position 9 through the manual insertion introduction path 19 which joins to the reverse rotation path 15.

Figure 2:
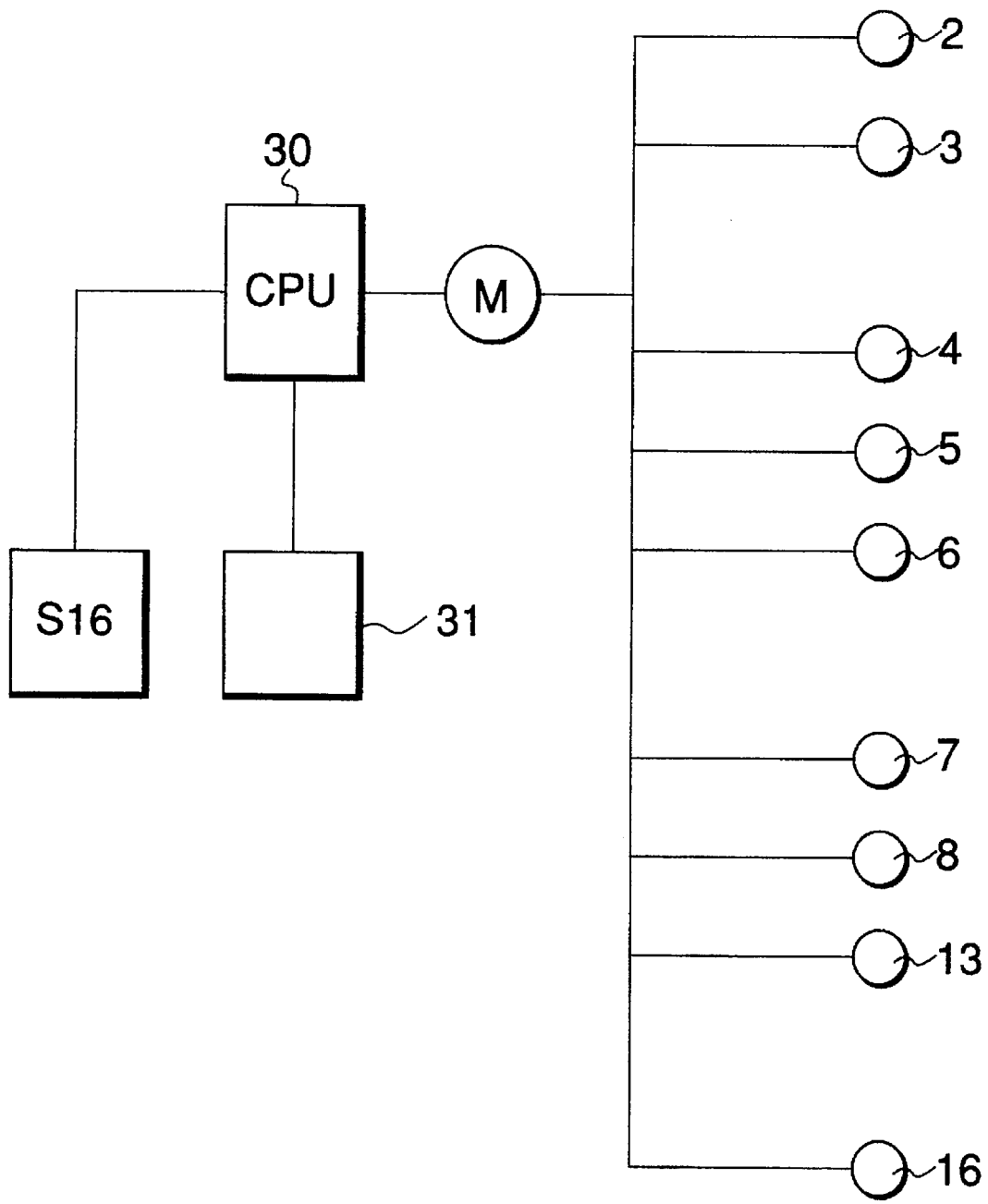
FIG. 2 is a schematic view showing a first example of a drive system.
Figure 3:
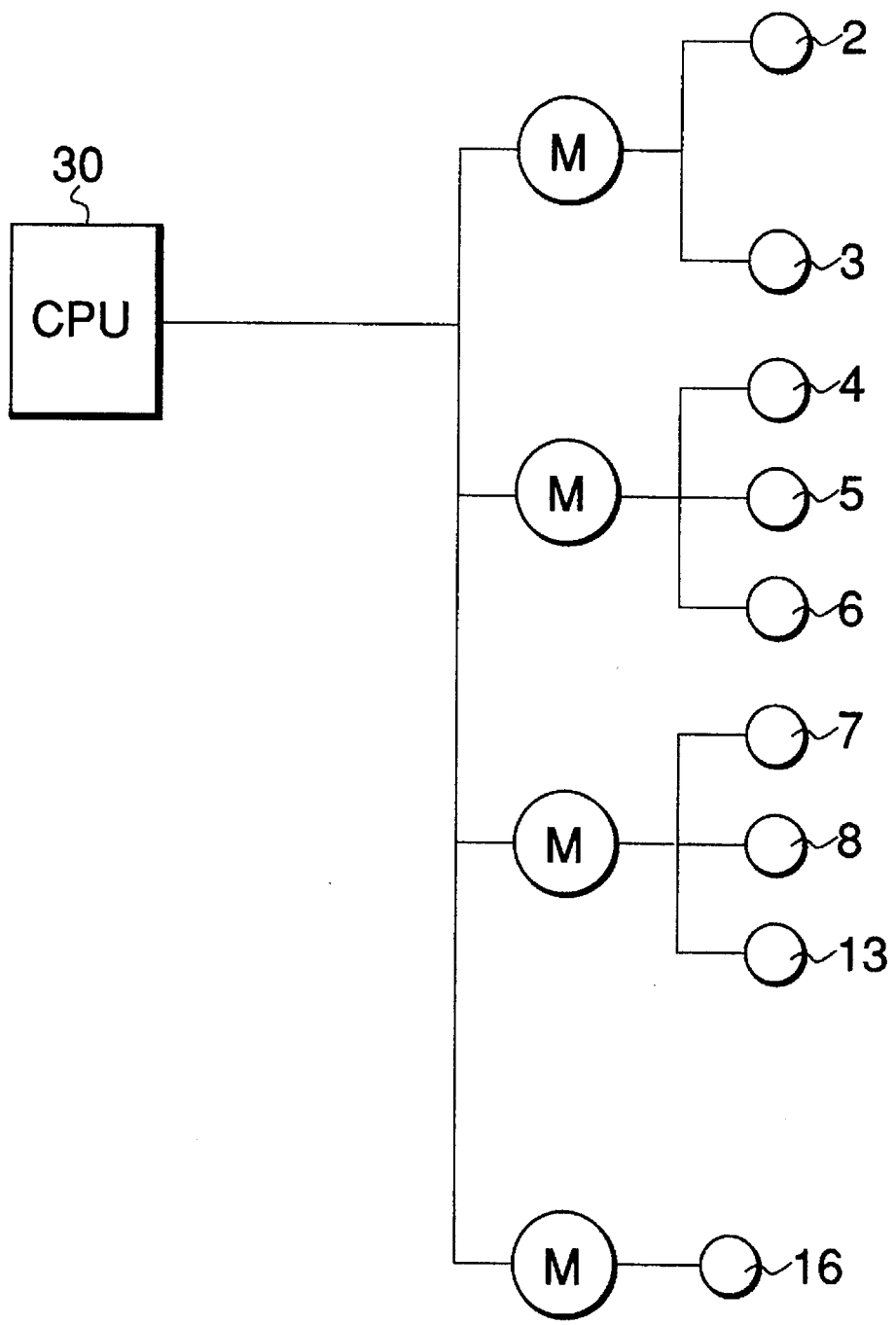
FIG. 3 is a schematic view showing a second example of a drive system.

Since each of the rollers 2 to 8, 13 and 16 is rotated only in one direction, as shown in FIG. 2, these rollers can be controlled only by a single motor 27. Of course, as shown in FIG. 3, the rollers 2 to 8, 13 and 16 may be divided into blocks and the number of motors same as the number of blocks may be provided to control the rollers in each block.

Figure 4:
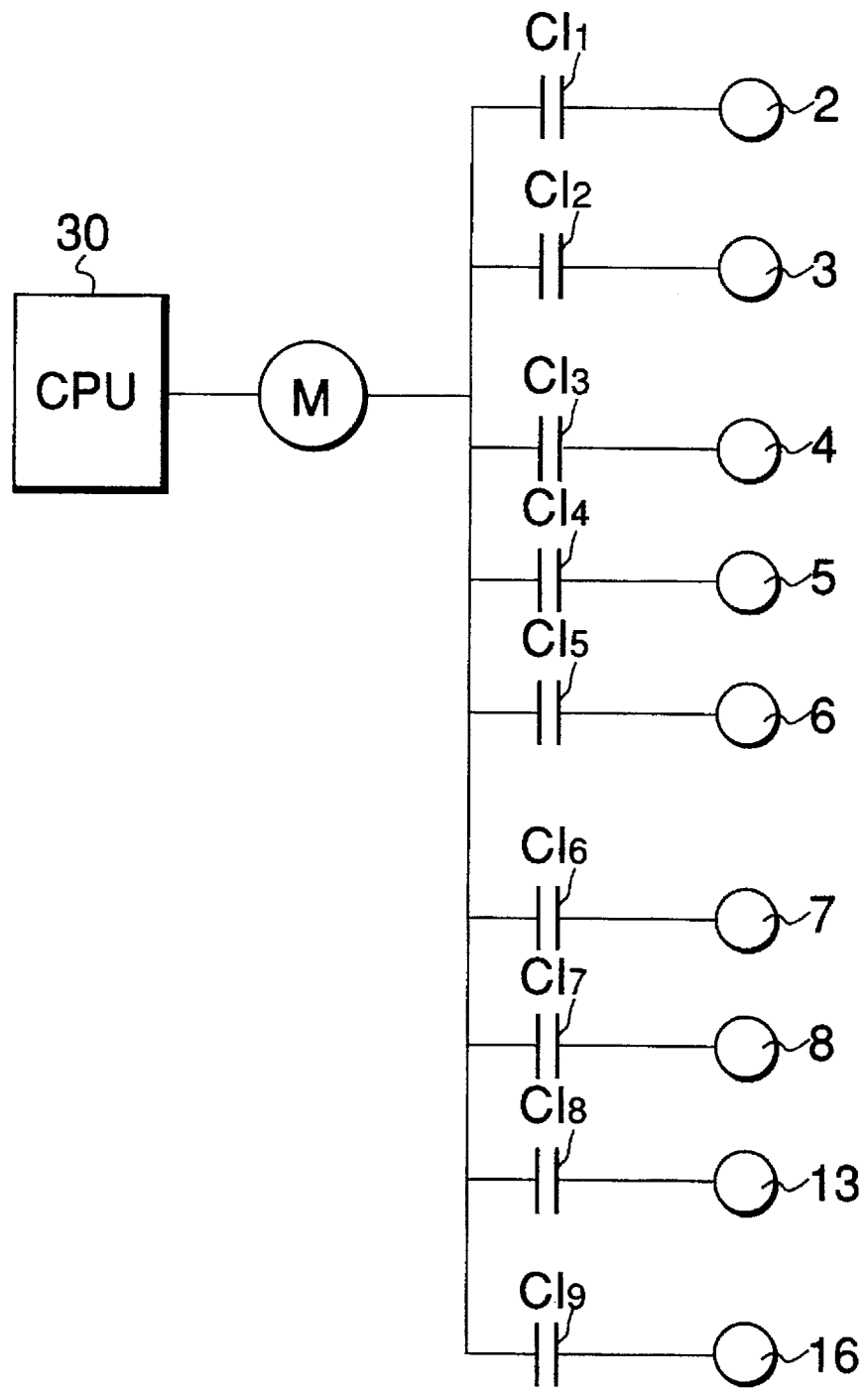
FIG. 4 is a schematic view showing a third example of a drive system.
Figure 5:
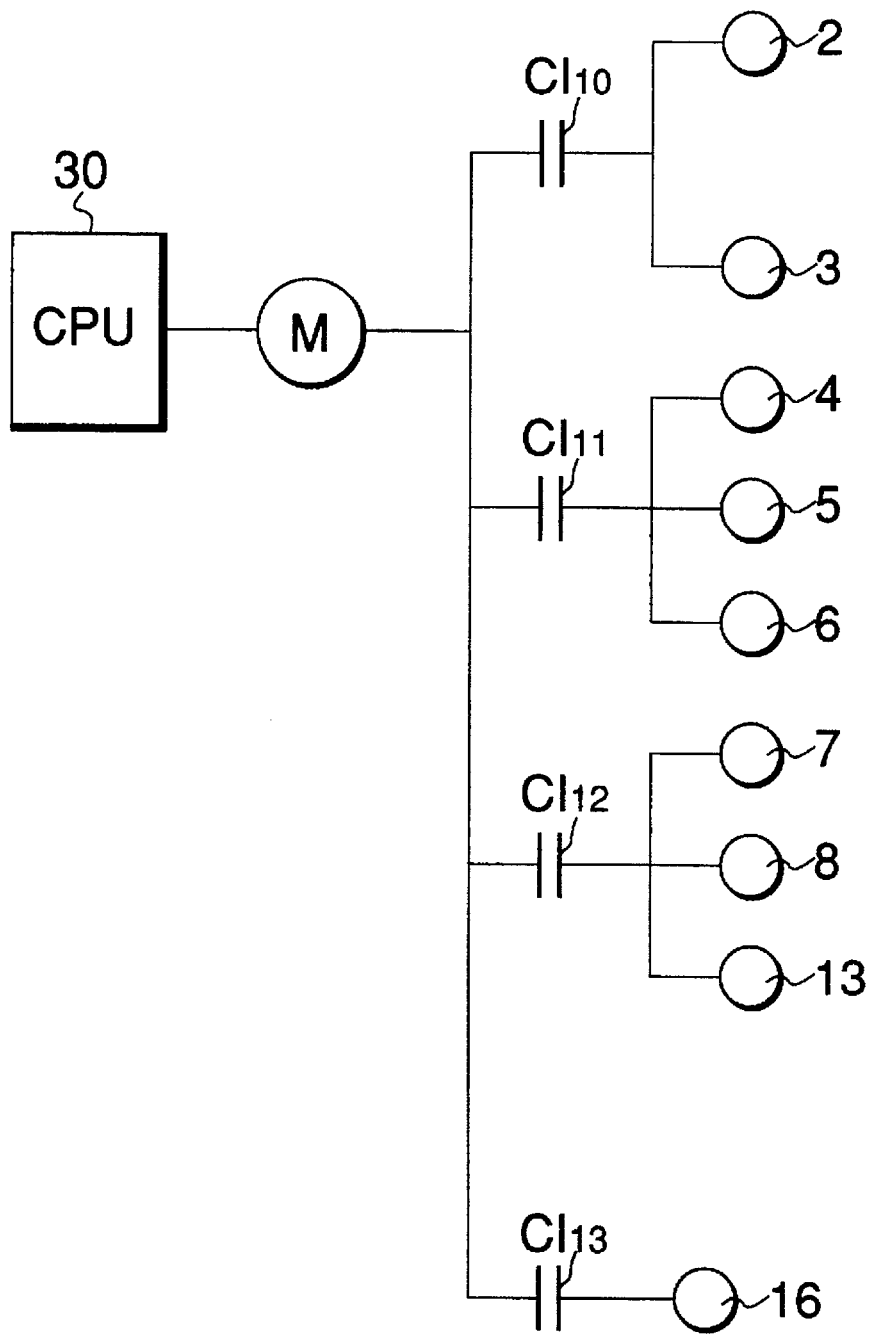
FIG. 5 is a schematic view showing a fourth example of a drive system.

The rotation and stoppage of the motor(s) can be controlled via a control circuit (CPU) 30 in response to a reading start signal or a copy start command signal. Incidentally, as shown in FIG. 4, when electromagnetic clutches cl1 to cl9 are arranged between the rollers and the motor 27, the degree of the freedom of control of the rollers is further improved. For example, the rollers may be rotated successively in response to the conveyance of the original, and the rollers through which the original has passed may be stopped successively. To this end, sensors for detecting the passage of the original may be arranged at downstream sides of the respective pair of rollers. Further, the rollers may be divided into blocks via clutches cl10 to cl13 as shown in FIG. 5.

In the manual insertion mode, the motor may be driven under the control of a sensors 16 for detecting the introduction of the sheet (original) P, or the motor may be driven by a manual insertion button (not shown). Incidentally, as shown by the two dot and chain line in FIG. 1, a manual sheet insertion opening may be provided in the proximity of the sheet convey rollers 3.

Next, an operation of the original feed apparatus according to this embodiment will be explained.

(1) In Case of One-Face Original

The sheet P supplied from the original stacking portion 1 is guided along the introduction path 21 by the sheet supply rollers 2 and the sheet convey rollers 3. Then, the sheet reaches the reading position 9 while rocking the flapper valve 10 around a fulcrum 10a. The image information on the sheet P is read by the optical system 26 while moving the sheet on the reading position 9. Thereafter, the sheet P is deflected along the flapper valve 11 to reach the sheet convey rollers 4 and then is deflected by the flapper valve 12 (broken position) to be guided in the discharge paths 18, 17. Then, the sheet is discharged onto the discharge tray 14 by the discharge rollers 13. The originals are stacked on the stacking portion 1 with imaged surface facing upwardly in page order (first page is top and last page is bottom).

(2) In case of both-face original

The sheet P supplied from the original stacking portion 1 is conveyed to the sheet convey rollers 4 through the reading position 9 by the sheet supply rollers 2, sheet convey rollers 3, flapper valve 10 and flapper valve 11, as is in the case of the one-face original.

However, in this case, since the flapper 12 disposed in the junction at the downstream side of the sheet convey rollers 4 is shifted to the position shown by the solid line by the plunger 31 in response to a both-face mode signal, the original is deflected toward the annular reverse rotation path 15 and is guided in this path by the sheet convey rollers 5, 6. Then, the original reaches the reading position 9 again while rocking the flapper valve 11 around a fulcrum 11a. Thereafter, while the original is being moved on the reading position 9, the image information on the second surface of the original is read by the optical system 26. Also in this case, the originals are stacked in page order (first page is top and last page is bottom).

The original P discharged from the reading position 9 is directed to the discharge path 17 along the flapper valve 10 and is conveyed in the direction shown by the arrow 29 by the sheet convey rollers 7, 8, and then is discharged onto the discharge tray 14 by the discharge rollers 13.

(3) In Case of Manual Insertion

The sheet P inserted through the manual insertion supply rollers 16 is conveyed along the manual insertion introduction path 19 by the sheet convey rollers 6 to reach the reading position 9 while rocking the flapper valve 11 around the fulcrum 11a. In the reading position 9, the image information on the sheet is read while moving the sheet. The original P discharged from the reading position 9 is directed to the discharge path 17 along the flapper valve 10 and is conveyed in the direction shown by the arrow 29 by the sheet convey rollers 7, 8, and then is discharged onto the discharge tray 14 by the discharge rollers 13.

(4) In Case of Another Example of Manual Insertion

Regarding the one-face original, the sheet P manually inserted through the sheet convey rollers 3 is treated in the same manner as the above case (1) (starting from the sheet convey rollers 3).

Regarding the both-face original, the sheet P manually inserted through the sheet convey rollers 3 is treated in the same manner as the above case (2) (starting from the sheet convey rollers 3).

As mentioned above, according to the illustrated embodiment, (a) the both faces of the original can be read (reading-through) in the convey path consisting of the single path, (b) the reading-through direction of the first surface of the original is opposite to the reading-through direction of the second surface of the original, and (c) by providing the pair of feed rollers 3, 4 and the pair of receiver rollers 6, 7 on both sides of the reading position 9, respectively (four pairs in total), the reversible rotation control of these rollers can be eliminated.

Incidentally, in the present invention, while the reading means of digital type was used, a reading means of analogue type having a turn-over switch circuit may be used. In addition, the original may be read by resting the original on the platen and by shifting the optical system.

Figure 6:
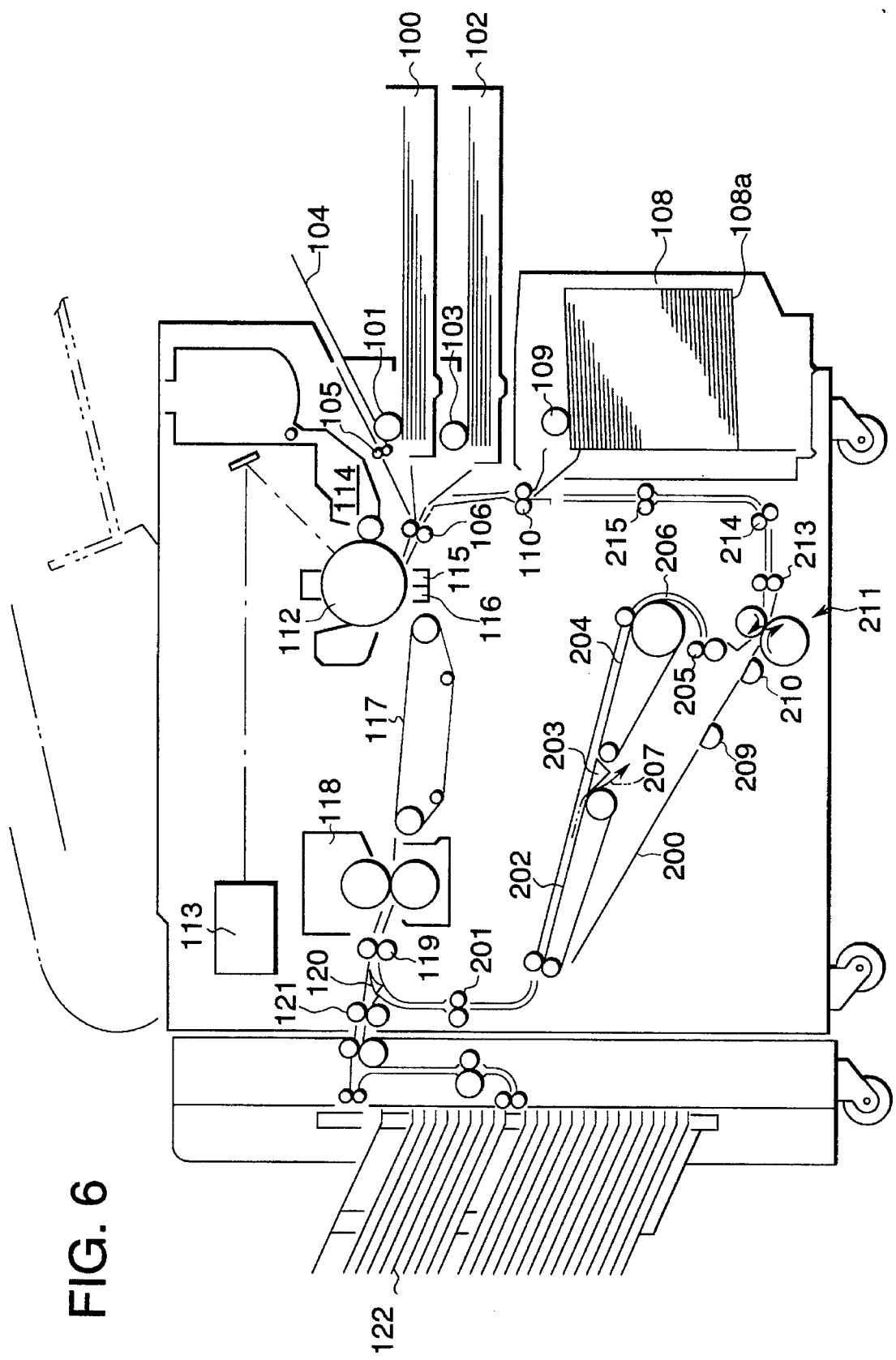
FIG. 6 is a sectional front view of an image forming apparatus into which the automatic original feed apparatus according to the present invention is incorporated.

Next, a preferred copying machine (or a printer) into which the automatic original reading apparatus is incorporated will be explained with reference to FIG. 6.

Sheets contained in an upper cassette 100 are separated one by one by a separation pawl and a sheet supply roller 101, and the separated sheet is sent to a pair of regist rollers 106. Sheets contained in a lower cassette 102 are separated one by one by a separation pawl and a sheet supply roller 103, and the separated sheet is sent to the pair of regist rollers 106. In a manual insertion sheet supply, a sheet manually inserted along a manual insertion guide 104 is sent to the pair of regist rollers 106 by rollers 105. A sheet stacking device (of deck type) 108 includes an intermediate plate 108a lifted and lowered by a motor. The sheets on the intermediate plate are separated one by one by a sheet supply roller 109 and a separation pawl, and the separated sheet is directed to convey rollers 110.

An image forming portion includes a photosensitive drum 112, a laser modulation means 113, a developing device 114, a transfer charger 115, and a separation charger 116.

A convey belt 117 serves to convey the sheet on which the image was formed to a fixing device 118. The sheet discharged from the fixing device 118 is conveyed by convey rollers 119 to a flapper 120, where the sheet is directed to a pair of discharge rollers 121 by which the sheet is sent to a sorter 122. The sorter 122 includes non-sort trays 122a, sort bin trays 122b, non-sort tray discharge rollers 122c and sort bin discharge rollers 122d, so that the non-sort trays and the sort bin trays are lifted to sort the sheets one by one. Incidentally, in place of the sorter, a discharge tray may be mounted.

The images corresponding to the number of copies (regarding the single original) to be obtained are successively formed on the photosensitive drum. Whenever the image is formed on the photosensitive drum, the sheet is supplied from the cassette 100 or 102 or deck 108. The registration of the supplied sheet is effected by the regist rollers 106 in a timed relation to the image formed on the photosensitive drum.

When the desired number of copies are obtained, a next original is read. Thereafter, the same procedures as mentioned above are repeated.

An intermediate tray 200 serves to stock the sheets on one surface of which the image was formed when the images are to be formed on both surfaces of each sheet or when plural images are to be formed on the same surface of the sheet in a superposed fashion (multi copy mode). Further, there are provided convey rollers 201, a convey belt 202, a flapper 203, a convey belt 204, and convey rollers 205. In the both-face copy mode, the sheet is directed to the intermediate tray 200 through a path 206. The sheets are stacked on the intermediate trays 200 with imaged surface facing upwardly. In the multi copy mode, the sheet is directed to the intermediate tray 200 through a path 207. In this case, the sheets are stacked on the intermediate trays 200 with imaged surface facing downwardly.

The sheets stacked on the intermediate tray 200 are separated one by one from the lowermost one by auxiliary rollers 209, 210 and a pair of reversible rollers 211, and the separated sheet is re-supplied. The re-supplied sheet is directed to the image forming portion by pairs of convey rollers 213, 214, 215, the convey rollers 110 and the regist rollers 106. After the image was formed on the sheet again, the sheet is discharged in the same manner as mentioned above.

Regarding the single original, the images are first copied on the first surfaces of the sheets, and the sheets are then rested on the intermediate tray 200 successively. Thereafter, the original is directed to the platen again while turning over the original, and the image on the back surface of the original is read. The read image is transferred on the sheet re-supplied from the intermediate tray 200.

What claimed is:

1. An automatic original feed apparatus comprising:

an original stacking portion on which a plurality of originals can be rested;

a transport path having (i) an introduction path for directing the original supplied from said original stacking portion to a reading position via a first side of said reading position, (ii) an annular path for reversing the surface of the original discharged from said reading position via a second side of said reading position and for directing the original to said reading position via said second side of said reading position again, said annular path being located on said second side of said reading position opposite to that of said introduction path, the original entering into said annular path and going out from said annular path through said second side, and (iii) a discharge path for discharging the original discharged from said reading position via said first side of said reading position to a discharge portion; and original feed rotary members arranged in said transport path, which totally provide the conveyance of the original along said transport path, wherein all of said original feed rotary members rotate in a single predetermined direction relating to a sheet supply direction.

2. An automatic original feed apparatus according to claim 1, wherein the reading of the original is effected by fixing a reading means and by moving the original.

3. An automatic original feed apparatus according to claim 1, further comprising a second discharge path for discharging the original discharged from said reading position onto said discharge portion in a one-face original reading mode.

4. An automatic original feed apparatus according to claim 1, further comprising a manual insertion introduction path for directing an original to said reading position, in addition to said introduction path.

5. An automatic original feed apparatus comprising:

an original stacking portion on which a plurality of originals can be rested;

an introduction path for directing the original supplied from said original stacking portion to a reading position;

an annular path for reversing the surface of the original discharged from said reading position and for directing the original to said reading position again;

a discharge path for discharging the original discharged from said reading position onto a discharge portion; and original feed rotary members arranged in said introduction path, said annular path and said discharge path, respectively, and rotated in a single predetermined direction relating to a sheet supply direction, wherein, among said original feed rotary members arranged in said annular path, a first rotary member is disposed in the proximity of an outlet of said reading position and a second rotary member is disposed in the proximity of an inlet of said reading position, and wherein a distance between said rotary members arranged in said introduction path and said first rotary members arranged in said annular path, and a distance between said rotary members arranged in said discharge path and said second rotary members arranged in said annular path are selected to be smaller than a size of a minimum original.

6. An automatic original feed apparatus according to claim 5, wherein a distance from said reading position through said first and second rotary members to said reading position is selected to be greater than a size of a maximum original.

7. An automatic original reading apparatus comprising:

an original stacking portion on which a plurality of originals can be rested;

an original reading means for reading the original at a reading position;

a transport path having (i) an introduction path for directing the original supplied from said original stacking portion to said reading position via a first side of said reading position, (ii) an annular path for reversing the surface of the original discharged from said reading position via a second side of said reading position and for directing the original to said reading position via said second side of said reading position again, said annular path being located on said second side of said reading position opposite to that of said introduction path, the original entering into said annular path and going out from said annular path through said second side of said reading position, and (iii) a discharge path for discharging the original discharged from said reading position to a discharge portion; and original feed rotary members arranged in said transport path, which totally provide the conveyance of the original along said transport path, wherein all of said original feed rotary members rotate in a single predetermined direction relating to a sheet supply direction.

8. An image forming apparatus having an automatic original feed apparatus, an original reading means for reading an original at a reading position, and both-face image forming means, said automatic original feed apparatus comprising an original stacking portion on which a plurality of originals can be rested, an introduction path for directing the original supplied from said original stacking portion to said reading position, an annular path for reversing the surface of the original discharged from said reading position and for directing the original to said reading position again, said annular path being located on a side of said reading position opposite to that of said introduction path, a discharge path for discharging the original discharged from said reading position onto a discharge portion, and original feed rotary members arranged in said introduction path, said annular path and said discharge path, respectively, and rotated in a single predetermined direction relating to a sheet supply direction, wherein a front surface and a back surface of the original is inverted by said automatic original feed apparatus, and the original is read by said reading means, and then read images are formed on front and back surfaces of a sheet by said both-face image forming means, and wherein, among said original feed rotary members arranged in said annular path, a first rotary member is disposed in the proximity of an outlet of said reading position and a second rotary member is disposed in the proximity of an inlet of said reading position, and wherein a distance between said rotary members arranged in said introduction path and said first rotary members arranged in said annular path, and a distance between said rotary members arranged in said discharge path and said second rotary members arranged in said annular path are selected to be smaller than a size of a minimum original.

9. An automatic original reading apparatus comprising:

an original stacking portion on which a plurality of originals can be rested;

an introduction path for directing the original supplied from said original stacking portion to a reading position;

an original reading means for reading the original at said reading position;

an annular path for reversing the surface of the original discharged from said reading position and for directing the original to said reading position again;

a discharge path for discharging the original discharged from said reading position onto a discharge portion; and original feed rotary members arranged in said introduction path, said annular path and said discharge path, respectively, and rotated in a single predetermined direction relating to a sheet supply direction, wherein, among said original feed rotary members arranged in said annular path, a first rotary member is disposed in the proximity of an outlet of said reading position and a second rotary member is disposed in the proximity of an inlet of said reading position, and wherein a distance between said rotary members arranged in said introduction path and said first rotary members arranged in said annular path, and a distance between said rotary members arranged in said discharge path and said second rotary members arranged in said annular path are selected to be smaller than a size of a minimum original.

10. An image forming apparatus having an automatic original feed apparatus, an original reading means for reading an original at a reading position, and both-face image forming means, said automatic original feed apparatus comprising an original stacking portion on which a plurality of originals can be rested, a transport path having (i) an introduction path located on a first side of said reading position for directing the original supplied from said original stacking portion to said reading position via the first side of the reading position, (ii) an annular path for reversing the surface of the original discharged from said reading position via a second side of the reading position and for directing the original to said reading position via said second side again, said annular path being located on said second side of said reading position opposite to that of said introduction path, said original entering into said annular path and going out from said annular path through said second side, and (iii) a discharge path for discharging the original discharged from said reading position to a discharge portion, and original feed rotary members arranged in said transport path, which totally provide the conveyance of the original along said transport path, wherein all of said original feed rotary members rotate in a single predetermined direction relating to a sheet supply direction;

wherein a front surface and a back surface of the original are inverted by said automatic original feed apparatus, and the original is read by said reading means, and then read images are formed on the front and the back surfaces of a sheet by said both-face image forming means.

11. An automatic original feed apparatus comprising:

an original inlet portion;

a transport path having (i) an introduction path for directing the original supplied from said original inlet portion to a reading position via a first side of said reading position, (ii) an annular path for reversing the surface of the original discharged from said reading position via a second side of said reading position and for directing the original to said reading position via said second side of said reading position again, said annular path being located on said second side of said reading position opposite to that of said introduction path, the original entering into said annular path and going out from said annular path through said second side, and (iii) a discharge path for discharging the original discharged from said reading position to a discharge portion; and original feed rotary members arranged in said transport path, which totally provide the conveyance of the original along said transport path, wherein all of said original feed rotary members rotate in a single predetermined direction relating to a sheet supply direction.

12. An automatic original feed apparatus according to claim 11, wherein reading of the original is effected by fixing a reading means and by moving the original.

13. An automatic original feed apparatus according to claim 11, further comprising a second discharge path for discharging the original discharged from said reading position onto said discharge portion in a one-face original reading mode.

14. An automatic original feed apparatus according to claim 11, further comprising a manual insertion introduction path for directing the original to said reading position, in addition to said introduction path.

15. An automatic original feed apparatus according to claim 11, wherein, among said original feed rotary members arranged in said annular path, a first rotary member is disposed in proximity to an outlet of said reading position and a second rotary member is disposed in proximity to an inlet of said reading position, and wherein a distance between original feed rotary members arranged in said introduction path and said first rotary member arranged in said annular path, and a distance between original feed rotary members arranged in said discharge path and said second rotary member arranged in said annular path are selected to be smaller than a size of a minimum original.

16. An automatic original feed apparatus according to claim 15, wherein a distance from said reading position through said first and second rotary members to said reading position is selected to be greater than a size of a maximum original.

* * * * *

UNITED STATES PATENT AND TRADEMARK OFFICE
CERTIFICATE OF CORRECTION

PATENT NO. : 5,597,153
DATED : January 28, 1997
INVENTOR(S) : Hiroyoshi MARUYAMA, et al.

It is certified that error appears in the above-indentified patent and that said Letters Patent is hereby corrected as shown below:

COLUMN 1:

Line 11, "a" (second occurrence) should be deleted.

COLUMN 2:

Line 1, "rotated" should read --being rotated--.

COLUMN 3:

Line 59, "a" should be deleted.

COLUMN 5:

Line 55, "(multi copy" should read --(multi-copy--; and
Line 61, "multi copy" should read --multi-copy--.

UNITED STATES PATENT AND TRADEMARK OFFICE
CERTIFICATE OF CORRECTION

PATENT NO. : 5,597,153

DATED : January 28, 1997

INVENTOR(S) : Hiroyoshi MARUYAMA, et al.

It is certified that error appears in the above-indentified patent and that said Letters Patent is hereby corrected as shown below:

COLUMN 6:

Line 14, "claimed" should read --is claimed--; and

Line 65, "predtermined" should read --predetermined--.

Signed and Sealed this

Nineteenth Day of August, 1997

*Attest:*

BRUCE LEHMAN

*Attesting Officer*  *Commissioner of Patents and Trademarks*